United States Patent [19]

Jung et al.

[11] 4,202,732

[45] May 13, 1980

[54] TIGHT CONNECTION BETWEEN FISSION GAS DISCHARGE CHANNELS

[75] Inventors: Wilfried Jung, Erlangen; Martin Peehs, Bubenreuth; Peter Rau, Mittelehrenbach über Forchheim; Wolfgang Krug, Jülich; Horst Stechemesser, Linnich-Tetz, all of Fed. Rep. of Germany

[73] Assignees: Kraftwerk Union Aktiengesellschaft, Mülheim; Kernforschungsanlage Jülich GmbH, Julich, both of Fed. Rep. of Germany

[21] Appl. No.: 817,223

[22] Filed: Jul. 20, 1977

[30] Foreign Application Priority Data

Jul. 23, 1976 [DE] Fed. Rep. of Germany ....... 2633192

[51] Int. Cl.² .............................................. G21C 3/16
[52] U.S. Cl. ......................................... 176/37; 176/60
[58] Field of Search ........................ 176/37, 38, 87, 60

[56] References Cited

U.S. PATENT DOCUMENTS

| | | | |
|---|---|---|---|
| 3,111,476 | 10/1963 | Sterry | 176/35 |
| 3,743,576 | 7/1973 | Fortescue | 176/37 |
| 3,928,129 | 12/1975 | Goetzmann | 176/38 |
| 4,077,839 | 3/1978 | Peehs et al. | 176/37 |

FOREIGN PATENT DOCUMENTS 2633192 1/1978 Fed. Rep. of Germany ............. 176/37

Primary Examiner—Samuel W. Engle
Assistant Examiner—S. A. Cangialosi
Attorney, Agent, or Firm—Herbert L. Lerner

[57] ABSTRACT

A gas-cooled nuclear reactor, having a tight connection with an intentionally provided leak site between a fission-gas discharge channel formed in a reactor core carrying plate as well as in a head portion of encased fuel elements that are suspended in receiving bores formed in the core carrying plate, the tight connection being formed by an annular member having a sealing surface engaging the core carrying plate at a region thereof in which an opening to the fission-gas discharge channel formed in the core carrying plate is located, a gas-tight, elastic and substantially cylindrical member, variable in length, connecting the annular member to the fission-gas discharge channel formed in the head portion of the fuel element, compression spring means biasing the annular member in a direction away from the fission gas discharge channel formed in the fuel-element head portion, and a sealing abutment plate secured to a central pin and limiting clearance for play of the annular member with respect to an annular zone thereof disposed within the sealing surface of the annular member, the leak site including a radial bore formed in and extending through the annular member between the annular zone and the sealing surface of the annular member.

3 Claims, 3 Drawing Figures

TIGHT CONNECTION BETWEEN FISSION GAS DISCHARGE CHANNELS

The invention relates to a tight or sealing connection having a predetermined or intentionally provided leak site between a fission-gas discharge channel formed in a core carrying plate of a gas-cooled nuclear reactor as well as in a head portion of encased or clad fuel elements for the gas-cooled reactor that are suspended in receiving bores formed in the core carrying plate.

Such fuel elements are pressure-relieved as compared to those of water-cooled nuclear reactors. This results from the fact that the gaseous fission products, the so-called fission gases, liberated in the fuel elements are discharged through a fission-gas collecting system and are conducted from there into a purifying circulatory loop of the reactor installation. It has been found to be advantageous for the construction of gas-cooled nuclear reactors to suspend the fuel elements forming the reactor core from a core carrying or support plate. The exchange or replacement of fuel elements is then effected from below the reactor core, and the core instrumentation on the other hand is led in or delivered from above the core carrying plate. The individual fuel elements are completely encased or clad so that a forced gas flow is conducted over the fuel rods contained in the fuel element. This cooling gas flow enters from above into the fuel element which is provided at this location with a tubular collar. Since the fuel elements generally have walls with an hexagonal geometry in order to achieve optimal utilization of the volume thereof, this tubular collar widens or flares along a conical intermediate portion thereof to the fuel element casing per se. Fastening or securing of the fuel element proper is effected by means of a latch or pawl mechanism in the head portion of the fuel element, which introduces a tensile force and presses the fuel element against the core carrying plate. The bore formed in the core carrying plate is also conically widened or flared and represents the installation zone for the fuel element. Obviously other installation constructions between fuel element and core carrying plate could be provided, nevertheless, the type of installation therebetween which is described herein has had the most extensive success.

For the transfer of the fission gas the hereinaforementioned conical installation surfaces could be used. If the gas transfer site is coordinated with this cone, however, problems arise with respect to the technically realizable angular accuracy, because the leakage of such a seal increases with the third power of the mutual angular deviation, and values are very rapidly reached that are greater than that value existing in front of the main blower for maintaining a pressure difference between this fission-gas transfer or transition site and the inlet site of the purified gas. This pressure difference ensures through an intentional leak, that an adequate continuous coolant gas flow will be provided through the fission-gas collecting lines and accordingly that a reliable removal of the fission gas which is entrained thereby or exhausted therewith will occur. In the case wherein this pressure difference would become too small, danger of the release of the radioactive fission gas directly into the coolant circulatory loop of the reactor would be revealed. Separation of this fission gas through the purifying circulatory loop would then be virtually impossible.

Since the assurance of a corresponding angular accuracy between the installation or engagement surfaces, fuel element and core carrying plate, is possible only with great difficulty when taking this point of view into consideration, the objective had already previously presented itself that, while maintaining the basic type of attachment or connection of the fuel elements to the core carrying plate, to ensure the provision of a tight connection of the fission gas lines, the accuracy or exactness of which is no longer dependent upon these conical installation or engagement surfaces.

Even though a connecting through-bored bracing member could be provided, placed flat against the core carrying plate yet lying spherically in a cone with respect to the head portion of the fuel-element, it has been found in practice, however, that such a construction, with the two sealing surfaces, especially with respect to the reliability of the sealing action, cannot yet be considered as completely satisfactory. Added to this is, that, with this solution, the carrying and sealing functions are both performed by one structural member. The hereinaforementioned objective demands a different solution which should not only be functionally reliable but also, when the fuel elements are released or relieved, should afford reliable closure thereof to prevent discharge of fission gas.

It is accordingly an object of the invention to provide a tight connection between fission gas discharge channels which meets the last-mentioned requirements.

With the foregoing and other objects in view, there is provided, in accordance with the invention, a gas-cooled nuclear reactor, a tight connection having an intentionally provided leak site between a fission-gas discharge channel formed in a reactor core carrying plate as well as in a head portion of encased fuel elements that are suspended in receiving bores formed in the core carrying plate, the tight connection being formed by an annular member having a sealing surface engaging the core carrying plate at a region thereof in which an opening to the fission-gas discharge channel formed in the core carrying plate is located, a gas-tight, elastic, and substantially cylindrical member, variable in length, connecting the annular member to the fission-gas discharge channel formed in the head portion of the fuel element, compression spring means biasing the annular member in a direction away from the fission gas discharge channel formed in the fuel-element head portion, and a sealing abutment plate secured to a central pin and limiting clearance for play of the annular member with respect to an annular zone thereof disposed within the sealing surface of the annular member the leak site comprising a radial bore formed in and extending through the annular member between the annular zone and the sealing surface of the annular member. Such a tight or sealing connection can be provided between the conical installation or engagement surfaces (the actual sealing surfaces of the annular member against the core carrying plate must then be flat or planar in the installation or engagement region), however, this connection could also be provided between flat or planar parts of the core carrying plate and the fuel-element head portion lying one on top of the other.

In accordance with another feature of the invention, the annular member has a generally cup-shaped cross section with a substantially cylindrical wall and is formed with a central bore through which the central pin freely extends, the substantially cylindrical wall of the annular member being formed with the radial bore of the leak site.

In accordance with a concomitant feature of the invention, the tight connection comprises a capsule-shaped body wherein an assembly of the annular member, the gas-tight, elastic and substantially cylindrical member, the compression spring means and the abutment plate secured to the central pin are received, the capsule-shaped body having a base formed with a through-bore for providing communication therethrough with the fission-gas discharge channel formed in the head portion of the respective fuel element, the capsule-shaped body being gas-tightly received and secured in a recess formed in the head portion of the respective fuel element.

Other features which are considered as characteristic for the invention are set forth in the appended claims.

Although the invention is illustrated and described herein as embodied in a tight connection between fission gas discharge channels, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
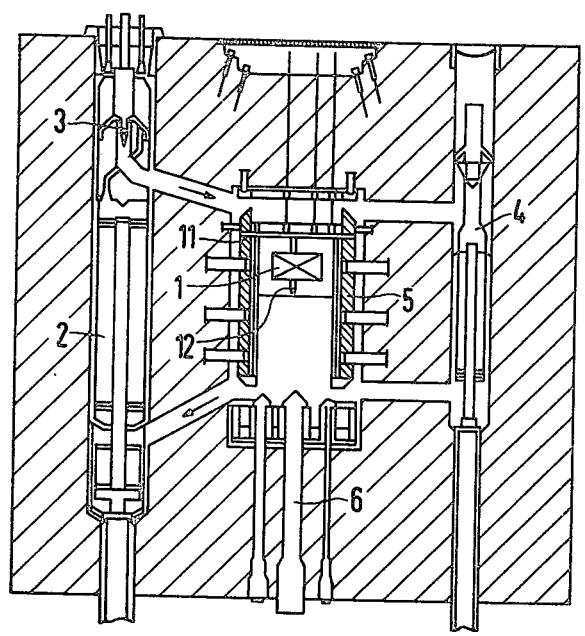
FIG. 1 is a diagrammatic sectional view of a gas-cooled nuclear reactor, and more specifically a fast breeder reactor.

Referring now to the drawing and first, particularly, to FIG. 1 thereof, there is shown a fast breeder reactor having a reactor core 1 formed essentially of fuel elements 12 (only one of which is illustrated in the interst of maintaining clarity of the drawing) that are secured to a core carrying plate 11. The reactor core 1 is mounted in a central zone of a reinforced concrete vessel and surrounded by several heat exchangers 2 as well as blowers 3 for cooling gas disposed symmetrically thereabout (only one each of the heat exchangers 2 and blowers 3 being illustrated to avoid obliterating other details of the drawing). The flow direction of the gaseous coolant, such as helium, for example, is indicated by the arrows in FIG. 1. Passageways 6 for a non-illustrated charging or loading machine beneath the reactor core 1 are also shown. The reactor core 1 is surrounded by a thermal shield 5, outside of which pumps 4 of an emergency cooling circulatory loop are disposed, only one of the pumps 4 being shown in FIG. 1. Fission gas discharge lines which are connected to the core carrying plate 11 and which lead to a purifying system of the reactor are not shown in detail in this generally diagrammatic view of FIG. 1.

Figure 2:
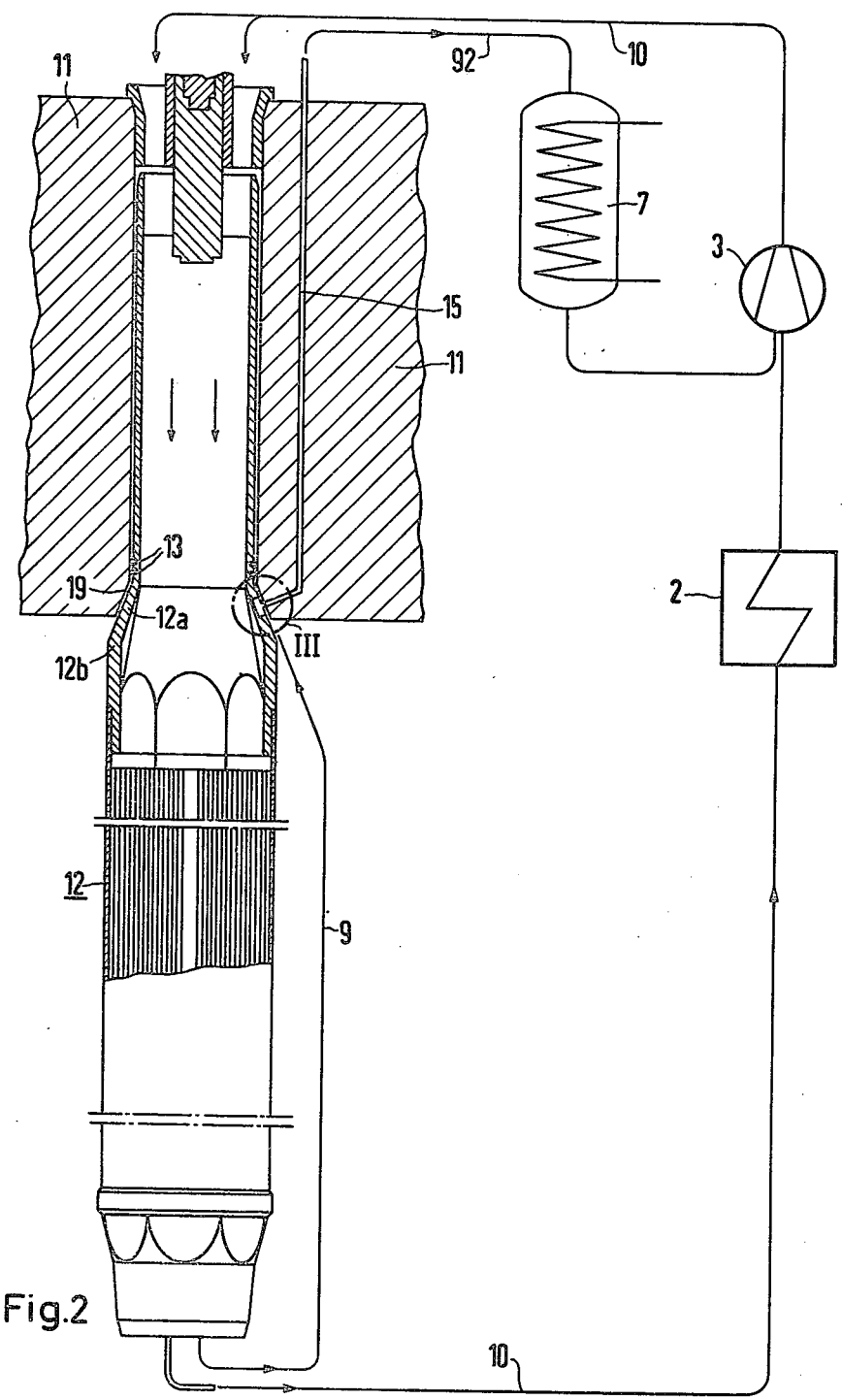
FIG. 2 is a fragmentary, partly schematic, enlarged view of FIG. 1 showing a fuel element and the seating thereof in the core carrying plate of the nuclear reactor in accordance with the invention.

An enlarged longitudinal sectional view of the fuel element 12 and the seating thereof in the core carrying plate 11, as well as a schematic circuit diagram of the coolant gas circulatory loop are shown in FIG. 2. The fuel element 12 suspended in the core carrying plate 11 is sealed with respect to the bore of the core carrying plate 11 by piston rings 13 so that cooling gas coming from above, as viewed in FIG. 2, out of a main circulatory loop 10 thereof and traveling in direction of the parallel, vertical and downwardly directed arrows, can flow only through the interior of the entire fuel element 12. The mechanism for fastening the fuel element 12 in the core carrying plate 11 is shown merely diagrammatically, because it is of no significance with respect to the invention of the instant application. The fuel element 12 has a casing 12b which is conically tapered at a transition location from the larger-diameter length thereof to a smaller-diameter tubular length thereof as shown in FIG. 2. This conically tapered portion is seated in a corresponding conical recess 19 formed in the core carrying plate 11. At this transition location the tight connection including the intentionally provided or predetermined leakage location or leak site is found within the dot-dash circular line III of FIG. 2 and is shown in greater detail in FIG. 3. Through this predetermined leakage location or leak site, a small partial flow 9 branching from the main cooling gas flow 10 flows into a fission-gas discharge channel 15 of the core carrying plate 11 and from there becomes intermixed with possible fission gases to form a gas flow 92 (FIG. 2) to a fission gas separator 7, and from the latter flows to the cooling gas blower 3. The main cooling-gas flow 10 leaving the fuel element or elements 12 initially enters the heat exchanger or steam generator 2 and flows from there to the blower 3, thereby closing the coolant circulatory loop. The coolant, as hereinaforementioned, can be helium gas, however, other gases, such as carbon dioxide, for example, are also suitable for this purpose.

Figure 3:
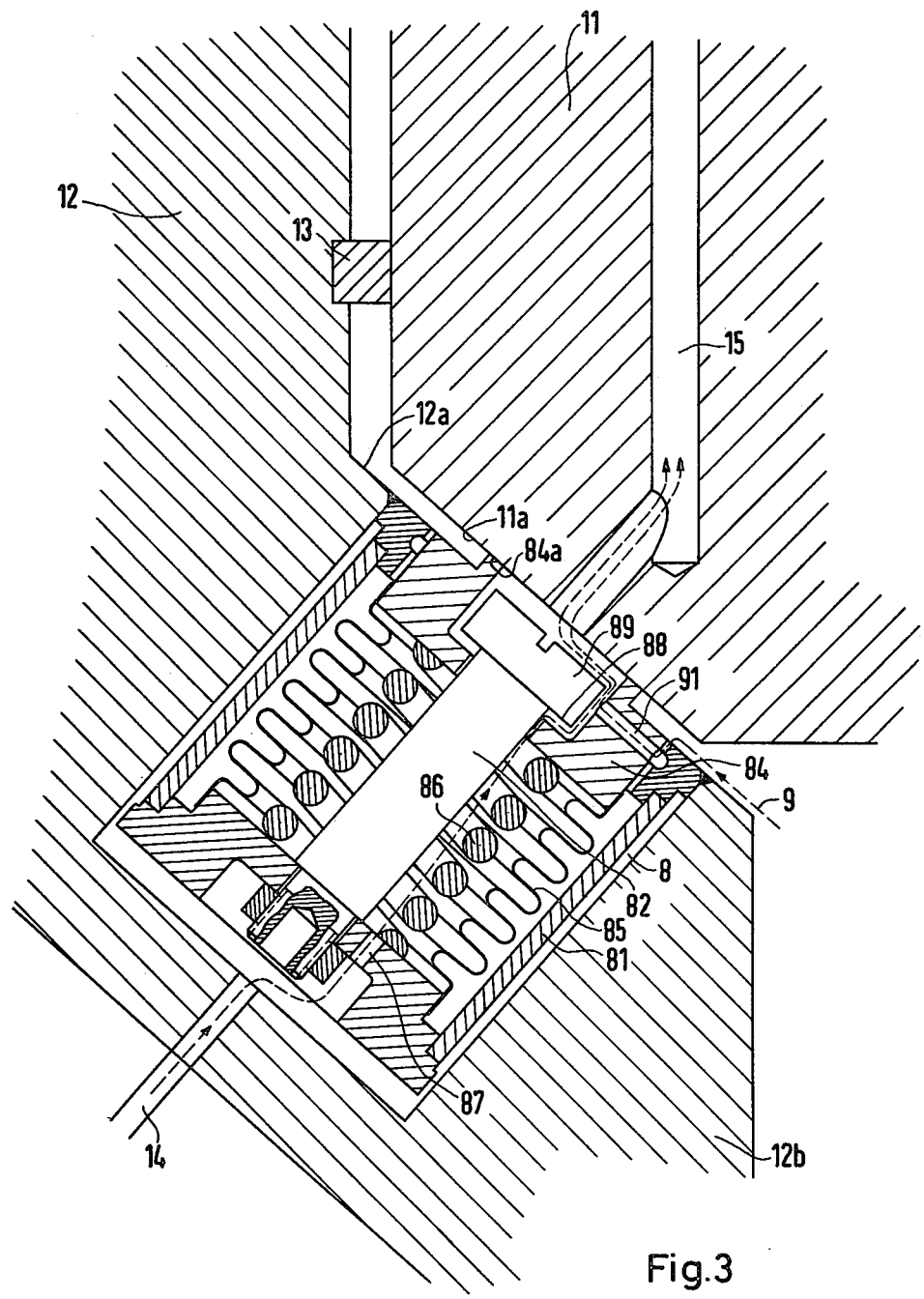
FIG. 3 is a greatly enlarged fragmentary view of FIG. 2 showing the encircled region III thereof.

The region III of FIG. 2 which is illustrated in greater detail in FIG. 3 shows the tight or sealing connection between the fission gas discharge channel 14 formed in the head of the fuel element 12 at the conically tapering portion 12b thereof and the fission gas discharge channel 15 formed in the core carrying plate 11. The channel 14 comes out of the interior of the fuel element 12 wherein the individual, non-illustrated fuel rods are connected thereto. Such a system is described in greater detail in German Published Non-Prosecuted application DT-OS 2040 904 and is therefore well-known in the art so that a detailed explanation thereof can be omitted, it is believed, from this specification.

A recess 8 is formed in the casing 12b of the fuel element 12 at the conically tapered portion 12a thereof, and the fission-gas discharge channel 14 terminates in this recess 8. A capsule-shaped body 81 is inserted in this recess 8 per se and, for example, as illustrated in FIG. 3, welded therein.

A bore 87 extends through a base member of the capsule-shaped body 81 and thereby provides free access for the fission gas into the interior thereof. In an opening formed in the upper end of the capsule 81 facing toward the core carrying plate 11 an annular member 84 formed with a central bore is located and is biased away from the base member of the capsule-shaped body 81 by a compression spring 86 disposed therebetween. The annular member 84, which need not be circular, but rather, may also be of oval or multiangular construction, for example, is formed with sealing surfaces 84a with which it engages a flat or planar surface 11a of the core carrying plate 11 wherein the fission-gas discharge channel 15 thereof has a terminating opening. The compression spring 86 thus ensures an adequate sealing pressure between the surface 11a of the core carrying plate 11 and the sealing surface 84a of the annular member 84. A central pin 82 carrying a stop or abutment plate 89 is provided for limiting the play of this annular member 84. If the fuel element 12 is removed from the core carrying plate 11, the spring 86 presses the annular member 84 against this abutment plate or stop 89 and thereby ensures the unity of the entire device. The annular member 84 is, furthermore, connected by an elastic metallic bellows 85 to the base member of the capsule-shaped body 81 so that a definite path is prescribed for the fission gas to be discharged from the channel 14 through the central bore of the annular member along the central pin 82. It is also clear therefrom that, when the fuel element 12 is removed from the core carrying plate 11, this path is closed due to the engagement of the annular member 84 with the stop or abutment plate 89. The abutment plate 89 is formed with an abutment surface 88 which is suitably machined to achieve the desired sealing action, as are also the parts of the annular member 84 coming in contact therewith.

The bellows 85 serves not only for establishing the flow path of the fission gas, but also as a flexible support or holder for the annular member 84, which can accordingly accommodate itself without difficulty to the respective angular position of the sealing surface 11a in the core carrying plate 11. The gap between the annular member 84 and the capsule-shaped body 81 has a suitably large dimension to permit such equalizing or accommodating movements.

As shown in FIG. 3, the annular member 84 has, for example, a generally cup-shaped cross section. The cylindrical wall thereof is formed with a through-bore 91. This bore 91 communicates, as shown, through the gap between the annular member 84 and the wall of the capsule 81, with the space surrounding the fuel element 12 which is subjected to the pressure of the cooling gas discharging from the fuel element 12. The flow 9 shown in FIG. 2 is represented by a broken-line arrow in FIG. 3 and leaks out through the predetermined or intentionally provided leakage bore 91 and travels into the channel 15 of the core carrying plate 11 as well as from there again to the fission-gas separator 7 as well as to the blower 3.

This flow 9 entrains the flow represented by the broken-line arrows coming from the fission-gas discharge channel 14. It exerts a given suction effect thereon so that even if any possible damage might occur to a fuel rod, no fission gas could escape through this damaged location because, due to the negative or underpressure in the fuel rods, normal cooling gas rushes into the fuel rod through this damaged location and, in this case, actually accelerates the discharge of the fission gas.

From this description of the functional mechanism of the fission-gas discharge with the aid of an auxiliary flow through the predetermined leakage bore 91 it follows that leakages at seals must be kept as small as possible. The solution provided by the hereinaforedescribed invention of the instant application has, with respect to the aforementioned German published non-prosecuted application, not only the advantage of a single sealing surface, but also that of an easier equalization of the angle tolerances of the sealing surfaces as well as of the always-definite compressive force exerted by the spring 86. The latter moreover simultaneously ensures the closure of the fission-gas discharge system if the fuel element has to be removed from the union thereof with the carrying structure.

As mentioned hereinbefore, this sealing connection is able to be used also at other, for example, flat or planar locations between the head or upper end of the fuel element and the carrying structure therefor. Also, the annular member 84 as well as the spring 86 and the bellows 85, for example, can have other possible constructions. A combination of springiness and elastic space separation provided by a suitable bellows, for example, and without any special spring may also be possible. It is also noted that it is advantageous for the function of the sealing connection according to the invention, that the core carrying plate and the fuel element head in the vicinity of this connecting location not engage one another flatly or areally but rather, be maintained at a slight spacing from one another by means of strips or ridges and the like because, in this manner, particles, such as dirt, for example, that might possibly impair the seal, can be removed more easily from the sealing space by the cooling gas.

There are claimed:

1. In a gas-cooled nuclear reactor, a tight connection having an intentionally provided leak site between a fission-gas discharge channel formed in a reactor core carrying plate as well as in a head portion of encased fuel elements that are suspended in receiving bores formed in the core carrying plate, the tight connection being formed by an annular member having a sealing surface engaging the core carrying plate at a region thereof in which an opening to the fission-gas discharge channel formed in the core carrying plate is located, a gas-tight, elastic and substantially cylindrical member, variable in length, connecting said annular member to the fission-gas discharge channel formed in the head portion of the fuel element, compression spring means biasing said annular member in a direction away from the fission gas discharge channel formed in the fuel-element head portion, and a sealing abutment plate secured to a central pin and limiting clearance for play of said annular member with respect to an annular zone thereof disposed within said sealing surface of said annular member, the leak site comprising a radial bore formed in and extending through said annular member between said annular zone and said sealing surface of said annular member.

2. Tight connection according to claim 1 wherein said annular member has a generally cup-shaped cross section with a substantially cylindrical wall and is formed with a central bore through which said central pin freely extends, said substantially cylindrical wall of said annular member being formed with the radial bore of the leak site.

3. Tight connection according to claim 1 comprising a capsule-shaped body wherein an assembly of said annular member, said gas-tight, elastic and substantially cylindrical member, said compression spring means and said abutment plate secured to said central pin are received, said capsule-shaped body having a base formed with a through-bore for providing communication therethrough with said fission-gas discharge channel formed in the head portion of the respective fuel element, said capsule-shaped body being gas-tightly received and secured in a recess formed in the head portion of the respective fuel element.

* * * * *